United States Patent Office 3,563,751
Patented Feb. 16, 1971

3,563,751
HEXAARYLBIIMIDAZOLE-ACRIDINE DYE COMPOSITIONS
Robert L. Cohen, Wilmington, Del., assignor to E. I. du Pont de Nemours and Company, Wilmington, Del., a corporation of Delaware
No Drawing. Filed July 20, 1967, Ser. No. 654,721
Int. Cl. G03c 1/72
U.S. Cl. 96—90       18 Claims

ABSTRACT OF THE DISCLOSURE

Visible-light activated phototropic compositions of a hexaarylbiimidazole that normally requires ultraviolet light for activation and a bis(alkylamino)acridine that is a visible-light absorbing energy-transfer agent, and optionally, an oxidizable leuco form of a dye, preferably an aminotriarylmethane. A method for irradiating the composition with visible light in the 370–520 m$\mu$ range.

BACKGROUND OF THE INVENTION (1) Field of the invention

This invention concerns novel visible-light sensitive phototropic compositions comprising a hexaarylbiimidazole and a bis(alkylamino)acridine dye.

(2) Description of the prior art

Hexaarylbiimidazoles dissociate upon exposure to ultraviolet light to form stable colored triarylimidazolyl radicals as described in British Pat. 997,396, published July 7, 1965. Such dissociation is useful in hexaarylbiimidazole/leuco dye compositions, for the imidazolyl radical, formed as described above, oxidizes the leuco form of the dye to the colored form. Thus, colored images are obtained making the compositions useful in imaging applications, as described in British Pat. 1,047,569, published Nov. 9, 1966. That ultraviolet light is required to activate the biimidazoles is a disadvantage, for in many applications it is desired to avoid such high-energy light because of its adverse effect on other constituents, or it is desired to use instead less costly lower energy visible light. Moreover, in some imaging applications, it is desired to cover the biimidazole-leuco dye composition with a transparent film. Some film materials, such as "Mylar" and "Cronar" commercial polyesters are not transparent to wavelengths below 300 m$\mu$ and thus prevent a good portion of the ultraviolet range from reaching the biimidazole.

It is, therefore, an object of the present invention to extend the spectral sensitivity of the ultraviolet light-absorbing hexaarylbiimidazoles to longer wavelength visible light and thereby provide visible-light activated hexaarylbiimidazole compositions useful as light screens and photooxidants, as described in British Pat. 997,396; and to provide novel hexaarylbiimidazole/leuco dye imaging compositions responsive to visible as well as ultraviolet light, useful as described in British Pat. 1,047,569.

SUMMARY OF THE INVENTION

This invention is directed to a visible-light sensitive composition comprising (A) a selected hexaarylbiimidazole which has its principal light absorption bands in the ultraviolet region of the electromagnetic radiation spectrum and is dissociable to triarylimidazolyl radicals on being irradiated with absorbable ultraviolet light, and (B) at least one 3,6-bis(alkylamino)acridine dye having its principal light absorption bands in the visible region of the spectrum, present in an amount sufficient to transfer energy to the hexaarylbiimidazole.

The invention is also directed to a composition containing components (A) and (B) above and (C) a leuco dye oxidizable to the colored form by triarylimidazolyl radicals.

The invention is further directed to a method for sensitizing a hexaarylbiimidazole to visible light which comprises irradiating it with visible light in the presence of an energy transfer amount of a visible light-absorbing bis(alkylamino)acridine dye, said visible light having wavelengths corresponding to the visible-light absorption bands of the acridine dye; and to a method of imagewise exposing a biimidazole/acridine dye/lecuo dye imaging composition as heretofore defined to a color-forming dosage of visible light.

The effect of the bis(alkylamino)acridine dye seems catalytic since only small amounts are normally required. The actual quantity employed depends on the particular biimidazole and the effect desired, but generally ranges from about 0.001 to 0.1 mole per mole of the biimidazole (preferably .01–.05 mole/mole). Smaller amounts may be used, but do not always give the desired effect, while larger amounts are often unnecessary. When the leuco dye is present, it is normally employed in amounts ranging from 0.1 to 10 moles per mole of biimidazole (preferably 0.5 to 2 mole/mole).

While the sensitization mechanism is not known with certainty, it is considered that when compositions of this invention comprising the biimidazole and the acridine dye are irradiated with such relatively long wavelength light as visible light, the biimidazole is substantially unaffected and remains in its ground (unactivated) state. The acridine dye, however, responding directly, absorbs the light and is activated to at least one excited energy transfer state. In such state, the activated dye transfers absorbed energy to the biimidazole, for example through collision or resonance interaction, and returns to the ground state, thus becoming available again for activation. The thus-indirectly-activated biimidazole dissociates into imidazolyl radicals.

The overall sensitization process can be represented as

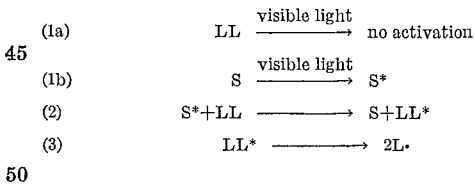

where S is the acridine sensitizer, S* its activated energy state; LL is the biimidazole (dimer), LL* its activated, dissociable state; L· is the resulting imidazolyl radical. The subsequent fate of the inherently colored and energy-rich imidazolyl radicals and their utilization in accordance with the various embodiments of this invention depends on the absence or presence of other substances that are reactive towards the radicals. Thus, in formulating light screens or windows containing the biimidazole/acridine sensitizer compositions of this invention, there will usually be employed other components, such as solvents, plasticizers and binders or carriers as described in said British Pat. 997,396 that are substantially inert, i.e., resistant, to oxidation by the imidazolyl radicals. In this embodiment, the sensitization process manifests itself as a color change, attributable to formation of the inherently colored triarylimidazolyl radical (Equation 3 above). When the light source is removed, the color fades as the radicals dimerize (Equation 4).

(4)          2L·→LL

The imidazolyl radicals are useful oxidants in the compositions of the invention involving the leuco dyes, as schematically illustrated in Equation 5

(5) $\quad 2L\cdot + DH_2 \rightarrow 2LH + D$ where $DH_2$, for example, is an oxidizable substance such as a leuco dye, D is the oxidation product (dye), and LH is the reduction product (triarylimidazole). Thus the biimidazole/bis(alkylamino)acridine combinations are particularly useful as visible light actuated photooxidants for a variety of substrates, including leuco dyes, and the biimidazole/sensitizer/leuco dye combinations composition of this invention constitutes the basic ingredient of visible light actuated imaging systems. This latter composition can also include other components such as solvents, plasticizers, binders or carriers as described in said British Pat. 1,047,796 that are substantially inert to composition ingredients.

DETAILED DESCRIPTION OF THE INVENTION (A) The bis(alkylamino)acridine dye component The energy-transfer visible-light absorbing bis(alkylamino)acridine dyes utilized in the present invention are those which absorb light maximally in the 370–520 mμ range and which have the general structural formula

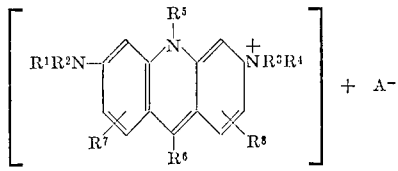

where $R^1$ and $R^3$ are each alkyl (particularly $C_1$–$C_4$ alkyl); and $R^2$ and $R^4$ are each hydrogen or alkyl (particularly $C_1$–$C_4$ alkyl); $R^5$ is hydrogen or alkyl (particularly $C_1$–$C_4$ alkyl); $R^6$ is hydrogen, alkyl (particularly $C_1$–$C_4$ alkyl) or $C_6$–$C_{10}$ aryl (particularly phenyl); $R^7$ and $R^8$ are each hydrogen, alkyl (particularly $C_1$–$C_4$ alkyl) or halogen (particularly chloro or bromo) and $A^-$ is an inert salt-forming anion, such as chlorine, nitrate, phosphate, sulfate, methanesulfonate, formate or the like anions which are conjugate bases of strong inorganic and organic acids. These compounds also absorb in the near ultraviolet region, at wavelengths longer than absorption maxima of the biimidazoles, and are capable of transferring such relatively short wavelength light as well as the longer wavelength visible light to the biimidazoles.

Preferably the acridine dyes are the 3,6-bis(dialkylamino)acridines.

Representative 3,6-bis(dialkylamino)acridine dyes are:

3,6-bis(dimethylamino)-acridine hydrochloride (Acridine Orange, C.I. 4600 5 B);
3,6-bis(dimethylamino)-10-methyl acridinium methanesulfonate (C.I. 46010);
2,7-dibromo-3,6-bis(dimethylamino)-acridine hydrochloride (C.I. 46015);
3,6-bis(dimethylamino)-9-phenyl acridine hydrochloride (C.I. 46055);
3,6-bis(diethylamino)-acridine hydrochloride (Diethyl Orange);
3,6-bis(dibutylamino)-acridine hydrochloride;
3,6-bis(dimethylamino)-9-butyl acridine hydrochloride;
3,6-bis(dimethylamino)-10-butyl acridinium chloride;
2,7-dichloro-3,6-bis(diethylamino)-acridine hydrochloride;
2,7 - dimethyl-3,6-bis(diethylamino)-acridine hydrochloride;
2,7 - dimethyl-3,6-bis(diethylamino)-acridine hydrochloride, and the like.

The acridine dyes may be used singly or as mixtures comprising two or more of such dyes.

(B) The hexaarylbiimidazole component

The hexaarylbiimidazoles are the 2,2',4,4',5,5'-hexaarylbiimidazoles that absorb ultraviolet light but little visible light, and are thereby dissociated into the corresponding 2,4,5-triarylbiimidazolyl radicals. The biimidazoles generally absorb maximally at absorption bands in the 250–275 mμ region, although the bands sometimes tail out to as low as 220 mμ and as high as 420 mμ. They can be represented by the formula

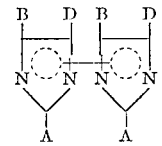

wherein A, B and D represent aryl groups which can be the same or different, carbocyclic or heterocyclic, unsubstituted or substituted with substituents that do not interfere with the dissociation of the biimidazole to the imidazolyl radical or with the oxidation of the leuco dye, and each dotted circle stands for four delocalized electrons (i.e., two conjungated double bonds) which satisfy the valences of the carbon and nitrogen atoms of the imidazolyl ring. The B and D aryl groups can be substituted with 0–3 substituents and the A aryl groups can be substituted with 0–4 substituents.

The aryl groups include one- and two-ring aryls, such as phenyl, biphenyl, naphthyl, furyl and thienyl. Suitable inert substituents on the aryl groups have Hammett sigma (para) values in the —.5 to 0.8 and are free of Zerewitinoff hydrogen, i.e., have no hydrogens reactive towards methyl magnesium iodide. Representative substituents and their sigma value (relative to H=.00), as given by Jaffe, Chem. Rev. 53, 219–233 (1953) are: methyl (—0.17), ethyl (—0.15), t-butyl (—0.20), phenyl (0.01), trifluoromethyl (0.55), chloromethyl (0.18), cyanomethyl (0.01), 2-carboxyethyl (—0.07), butoxy (—0.32), phenoxy (—0.03), fluoro (0.06), chloro (0.23), bromo (0.23), iodo (0.28), methylthio (—0.05), methylsulfonyl (0.73), nitro (0.78), ethoxycarbonyl (0.52), and cyano (0.63). Thus, the substituents may be halogen, cyano, lower hydrocarbyl (including alkyl, halo alkyl, cyanoalkyl, and aryl), alkoxy, aryloxy, alkylthio, arylthio, alkyl sulfonyl, arylsulfonyl, and nitro. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range —.4 to +.4, particularly lower alkyl, lower alkoxy, Cl, F and Br groups.

In a preferred biimidazole class, the 2 and 2' aryl groups are phenyl rings bearing an ortho substituent having a Hammett sigma value in the range —.4 to +4. Preferred such ortho substituents are fluorine, chlorine, bromine, lower alkyl and alkoxy groups; especially chloro.

Most preferably, the 2-phenyl ring carries only the above-described ortho group, and the 4- and 5-phenyl rings are either unsubstituted or substituted with lower alkoxy.

Representative hexaarylbiimidazoles which may be used in the practice of this invention are:

2,2'-bis(o-bromophenyl)-4,4',5,5'-tetraphenylbiimidazole,
2,2'-bis(p-bromophenyl)-4,4',5,5'-tetraphenylbiimidazole,
2,2'-bis(p-carboxyphenyl)-4,4',5,5'-tetraphenylbiimidazole,
2,2'bis(o-chlorophenyl)-4,4',5,5'-tetrakis(p-methoxyphenyl)biimidazole,
2,2'-bis(o-chlorophenyl)-4,4',5,5'-tetraphenylbiimidazole,
2,2'-bis(p-chlorophenyl)-4,4',5,5'-tetrakis(p-methoxyphenyl)biimidazole,
2,2'-bis(p-cyanophenyl)-4,4',5,5'-tetrakis(p-methoxyphenyl)biimidazole,
2,2'-bis(2,4-dichlorophenyl)-4,4',5,5'-tetraphenylbiimidazole, 2,2'-bis(2,4-dimethoxyphenyl)-4,4',5,5'-tetraphenylbiimidazole,
2,2'-bis(o-ethoxyphenyl)-4,4'5,5'-tertaphenylbiimidazole,
2,2'-bis(m-fluorophenyl)-4,4',5,5'-tetraphenylbiimidazole,
2,2'-bis(o-fluorophenyl)-4,4',5,5'-tetraphenylbiimidazole,
2,2'-bis(p-fluorophenyl)-4,4',5,5'-tetraphenylbiimidazole,
2,2'-bis(o-hexoxyphenyl)-4,4',5,5'-tetraphenylbiimidazole,
2,2'-bis(o-hexylphenyl)-4,4',5,5'-tetrakis(p-methoxyphenyl)biimidazole,
2,2'-bis(3,4-methylenedioxyphenyl)-4,4',5,5'-tetraphenylbiimidazole,
2,2'-bis(o-chlorophenyl)-4,4',5,5'-tetrakis(m-methoxyphenyl)biimidazole,
2,2'-bis(o-chlorophenyl)-4,4',5,5'-tetrakis[m-(betaphenoxyethoxyphenyl)biimidazole.
2,2'-bis(2,6-dichlorophenyl)-4,4',5,5'-tetraphenylbiimidazole,
2,2'-bis(o-methoxyphenyl)-4,4',5,5'-tetraphenylbiimidazole,
2,2'-bis(p-methoxyphenyl)-4,4',-bis(o-methoxyphenyl)-5,5'-diphenylbiimidazole,
2,2-bis(o-nitrophenyl)-4,4',5,5'-tetraphenylbiimidazole,
2,2'-bis(p-phenylsulfonylphenyl)-4,4',5,5'-tetraphenylbiimidazole,
2,2'-bis(p-sulfamoylphenyl)-4,4',5,5'-tetraphenylbiimidazole,
2,2'-bis(2,4,6-trimethylphenyl)-4,4',5,5'-tetraphenylbiimidazole,
2,2'-di-4-biphenylyl-4,4',5,5'-tetraphenylbiimidazole,
2,2'-di-1-naphthyl-4,4',5,5'-tetrakis(p-methoxyphenyl)biimidazole,
2,2'-di-9-phenanthryl-4,4',5,5'-tetrakis(p-methoxyphenyl)biimidazole,
2,2'-diphenyl-4,4',5,5'-tetra-4-biphenylylbiimidazole,
2,2'-diphenyl-4,4',5,5'-tetra-2,4-xylylbiimidazole,
2,2'-di-3-pyridyl-4,4',5,5'-tetraphenylbiimidazole,
2,2'-di-3-thienyl-4,4',5,5'-tetraphenylbiimidazole,
2,2'-di-o-tolyl-4,4',5,5'-tetraphenylbiimidazole,
2,2'-di-p-tolyl-4,4'-di-o-tolyl-5,5'-diphenylbiimidazole,
2,2'-di-2,4-xylyl-4,4',5,5'-tetraphenylbiimidazole,
2,2',4,4',5,5'-hexakis(p-benzylthiophenyl)biimidazole,
2,2',4,4',5,5'-hexa-1-naphthylbiimidazole,
2,2',4,4',5,5'-hexaphenylbiimidazole,
2,2'-bis(2-nitro-5-methoxyphenyl)-4,4',5,5'-tetraphenylbiimidazole, and
2,2'-bis(o-nitrophenyl)-4,4',5,5'-tetrakis(m-methoxyphenyl)biimidazole.

The biimidazoles are conveniently obtained by known methods as more particularly described by British Pat. 997,396 and by Hayashi et al., Bull. Chem. Soc. Japan, 33, 565 (1960). The preferred method, involving oxidative dimerization of the corresponding triarylimidazole with ferricyanide in alkali, generally yields the 1,2'-biimidazoles, although other isomers, such as the 1,1',1,4', 2,2',2,4' and 4,4'-biimidazoles are sometimes also obtained admixed with the 1,2'-isomer. For the purposes of this invention, it is immaterial which isomer is employed so long as it is photodissociable to the imidazolyl radical as discussed above.

Biimidazoles useful in this invention are described in South African patent application 3,627/63, published Aug. 12, 1963, and in British Pat. 997,396, published July 7, 1965.

(C) The leuco dye component

The leuco dye component together with the biimidazole and the acridine dye forms one embodiment of this invention. By the term "leuco dye" is meant the colorless (i.e., the reduced) form of a dye compound which upon oxidation becomes colored. When present in the composition of this invention, it is oxidized to its colored form by the imidazolyl radical.

Leuco dyes which may be oxidized to color by triarylimidazolyl radicals generated by this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco idamines, aminohydrocinnamic acids (cyanoethanes, leuco methines), hydrazines, leuco indigoid dyes, amino-2,3-dihydroanthraquinones, tetrahalo-p,p'-biphenols, 2(p-hydroxyphenyl)-4,5-diphenylimidazoles, phenethylanilines, and the like.

The aminotriarylmethanes are preferred, especially those containing tertiary-amino groups, and in particular those wherein (1) at least two aryls are phenyls having (a) a para-$R_1R_2N$ substituent, where $R_1$ and $R_2$ are $C_1$-$C_{10}$ alkyl, 2-hydroxyethyl, 2-cyanoethyl, benzyl or phenyl, and (b) an ortho $C_1$-$C_6$ alkyl, $C_1$-$C_6$ alkoxy, fluoro, chloro, or bromo-substituent and (2) the third aryl, when different from the first two, is thienyl, furyl, phenyl or phenyl substituted with one or more $C_1$-$C_6$ alkyl, $C_1$-$C_6$ alkoxy, methylenedioxy, fluoro, chloro, bromo, dialkylamino, alkylthio or benzylthio groups.

Representative aminotriarylmethanes that may be used in this invention follow:

bis(2-bromo-4-diethylaminophenyl)phenylmethane,
bis(2-butoxy-4-diethylaminophenyl)phenylmethane,
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)2-thienylmethane,
bis(4-diethylamino-2-ethylphenyl)(3,4-methylenedioxyphenyl)-methane,
bis(4-diethylamino-2-fluorophenyl)(p-benzylthiophenyl)methane,
bis(4-diethylamino-2-fluorophenyl)(3,4-methylenedioxyphenyl)methane,
bis(4-diethylamino-2-methoxyphenyl)(p-nitrophenyl)methane,
bis(4-diethylamino-1-naphthyl)(4-diethylamino-o-tolyl)methane,
bis(4-diethylamino-o-tolyl)(p-benzylthiophenyl)methane,
bis(4-diethylamino-o-tolyl)(2,4-dimethoxyphenyl)methane,
bis(4-diethylamino-o-tolyl)2-furylmethane,
bis(4-diethylamino-o-tolyl)(p-methoxyphenyl)methane,
bis(4-diethylamino-o-tolyl)(3,4-methylenedioxyphenyl)methane,
bis(4-diethylamino-o-tolyl)(p-methylthiophenyl)methane,
bis(4-diethylamino-o-tolyl)1-naphthylmethane,
bis(4-diethylamino-o-tolyl)phenylmethane,
bis(4-diethylamino-o-tolyl)2-thienylmethane,
tris(4-dimethylamino-2-chlorophenyl)methane,
bis(4-dimethylamino-2,5-dimethylphenyl)phenylmethane,
bis(4-dimethylamino-2-hexylphenyl)(p-butylthiophenyl)methane,
bis(4-dimethylamino-o-tolyl)(o-bromophenyl)methane,
bis[4-(N-ethylanilino)-o-tolyl](3,4-dibutoxyphenyl)methane,
bis(4-ethylbenzylamino-o-tolyl)(p-methoxyphenyl)methane,
bis[4-bis(2-hydroxyethyl)amino-2-fluorophenyl](p-benzylthiophenyl)methane,
tris(4-diethylamino-o-tolyl)methane, and
tris(p-dioctylamino-o-tolyl)methane.

These amino substituted cationic dye precursors are generally employed in the color forming process as salts of strong acids, including Lewis acids, such as hydrochloric, hydrobromic, sulfuric, nitric, phosphoric, acetic, oxalic, p-toluenesulfonic, zinc chloride, zinc bromide, and ferric chloride, the proportion of acid varying from 0.33 mole to one mole per amino group.

These leuco dyes are described more fully in said British Pat. 1,047,569.

As mentioned previously, the compositions of this invention can and usually do contain inert solvents, plasticizers, binders, substrates and the like (0.5% by weight or more of each based on the total composition weight).

The compositions of this invention are prepared simply by mixing them together, usually in a solvent and/or binder. The solution can then be applied to a substrate in usual fashion, e.g., spray, brush, roller, dipping, and the like.

Suitable solvents are those inert to the other ingredients of the composition and include amides such as N,N-dimethylformamide, N,N-dimethylacetamide; alcohols such as methanol, ethanol, 1-propanol, 2-propanol, butanol, ethylene glycol; ketones such as acetone, methyl ethyl ketone, 3-pentanone; halocarbons such as methylene chloride, chloroform, 1,1,2-trichloroethane, and 1,1,2,2-tetrachloroethane; polyethylene glycols; esters, e.g., ethyl acetate and ethyl benzoate; aryls such as benzene, o-dichlorobenzene and toluene; dimethylsulfoxide, pyridine, acetonitrile, tetrahydrofuran, dioxane, 1,1,2-trichloroethylene, 1-methyl-2-oxohexamethyleneimine, and mixtures thereof.

Suitable inert plasticizers include the polyethyleneglycols, such as the commercially available carbowaxes, and related materials, such as substituted phenol-ethylene oxide adducts, for example the products obtained from p-phenylphenol and 6 moles ethylene oxide, and from p-nonylphenol and 2 moles ethylene oxide, including commercially available materials such as the Igepal alkyl phenoxy polyoxyethylene ethanols.

Polymeric materials, particularly light-transparent and film-forming polymers, are useful as inert binders, and carriers for the essential ingredients described above; thus, biimidazole, leuco dye, sensitizers and polymer, with or without a mutual solvent, may be mixed, then sprayed, extruded, cast, pressed or otherwise formed into supported or unsupported films or shaped articles. Representative polymers are polyvinyl alcohol, ethyl cellulose, polyvinyl chloride, polystyrene, polyvinyl acetate, poly(methyl methacrylate), cellulose acetate, cellulose butyrate, copolymers of vinyl monomers, gelatin, and polyethylene. Other suitable inert materials which may be used include glasses, resins, and waxes.

Typical inert substrates include materials commonly used in the graphic arts and in decorative applications, such as paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass; wood and metals.

Any convenient light source providing wavelengths in the visible region of the spectrum that overlap the sensitizing dyes absorption bands may be used to activate the light-sensitive compositions for imidazolyl radical and image formation. The light may come from natural or artificial sources, may be monochromatic or polychromatic, incoherent or coherent, and for high efficiency should correspond closely in wavelengths to the principal absorption bands of the sensitizing dye employed and should be sufficiently intense to activate a substantial proportion of the sensitizer. Also, it may often be advantageous to employ visible light in conjunction with ultraviolet light normally required to dissociate the dimer to increase the speed of imidazolyl radical and image formation.

(D) Examples

Representative examples further illustrating the invention follow, and are not meant to be limiting:

EXAMPLES 1–7

Visible-light sensitive biimidazole compositions containing the following ingredients were prepared as solutions in acetone, a convenient carrier solvent:

| Component | Molarity | Relative mole ratio o-ClHABI=1 |
|---|---|---|
| 2,2'-bis(o-chlorophenyl)-4,4',5,5'-tetraphenylbiimidazole | $3 \times 10^{-2}$ | 1.0 |
| tris(N,N-diethylamino-o-tolyl)methane | $1.5 \times 10^{-2}$ | 0.5 |
| p-Toluene sulfonic acid | $3 \times 10^{-2}$ | 1.0 |
| Acridine dye as tabulated below | $4 \times 10^{-4}$ | 0.0133 |

Control solutions without biimidazole or sensitizer were also prepared for comparison.

For testing, each solution was mixed with 6.8% by weight of a polyethylene ether having an average molecular weight of about 550 as a binder, and spotted on 1″ x 3″ strips of Whatman No. 1 filter paper. After the acetone had evaporated, the papers were irradiated, by contact flashing with a Xenon flash lamp (HiCo Lite, emitting ultraviolet and visible light about 200 m$\mu$ and approximating ordinary sun light), directly and through a series of sharp cut off filters, as designated below, which transmit wavelengths longer than that specified but substantially no shorter wavelengths.

| | Available as Corning filter No./ Glass No. | Cut off wave length, m$\mu$ |
|---|---|---|
| Filter: | | |
| 1 | 3-74/3391 | 370 |
| 2 | 3-72/3387 | 430 |
| 3 | 3-71/3385 | 470 |
| 4 | 3-69/3486 | 520 |

This test demonstrates biimidazole photolysis to triarylimidazolyl radicals through reaction of the radicals with triarylmethane leuco dye, evidenced by formation of the triarylmethane dye's characteristic blue color.

The more effective the system to generate triarylimidazolyl radicals under a given light stimulus, the deeper the color, with intense>medium>light>faint blue.

The results are tabulated below:

VISIBLE-LIGHT-SENSITIZED BIIMIDAZOLE PHOTOLYSIS

| | Acridine [2] | Filter/color formation [1] | | | |
|---|---|---|---|---|---|
| | | 1, 370 m$\mu$→ | 2, 430→ | 3, 470→ | 4, 520→ |
| Example: | | | | | |
| 1 | 3,6-bis(diethylamino) | Intense | Intense | Medium | Light. |
| 2 | 3,6-bis(dimethylamino) | do | do | do | |
| 3 | 2,7-dimethyl-3,6-bis(ethylamino) | do | do | do | |
| 4 | 2,7-dimethyl-3,6-bis(diethylamino) | do | do | do | |
| Controls: | | | | | |
| 5 | Biimidazole/no acridine | Light | Faint | None | None. |
| 6 | No biimidazole/no acridine | None | None | | |
| 7 | Acridine [3]/no biimidazole | do | do | | |

[1] Without a filter (300 m$\mu$→), all formulations containing biimidazole developed intense color.
[2] All as the hydrochloride.
[3] Each acridine was tested.

Substantially the same results were obtained on repeating the above series of experiments described in Examples 1–4 with 2(o - chlorophenyl)-4,5-bis(m-methoxyphenyl) imidazolyl dimer as the photooxidant. In addition, a composition of 2(o-chlorophenyl)-4,5-bis(m-methoxyphenyl) imidazolyl dimer and 3,6-bis(diethylamino)acridine hydrochloride was photolized with an argon ion laser beam with similar color formation.

It is concluded from these results that (1) the biimidazole is the photooxidant and its activation in the absence of sensitizer requires relatively short wavelength light, (2) the sensitizer extends the spectral sensitivity of the biimidazole towards longer wavelength light, permitting it to effectively utilize near ultraviolet and blue (visible) light for activation.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A visible-light sensitive composition comprising
   (A) 2,2′,4,4′,5,5′-hexaarylbiimidazole wherein
     each aryl group contains 6–14 carbon atoms;
     the 4,4′,5 and 5′-aryl groups contain 0–3 substituents that are free of hydrogen capable of reacting with methyl magnesium iodide and have a sigma value between —.5 and +0.8;
     the 2 and 2′ aryl groups contain 0–4 substituents that are free of hydrogen capable of reacting with methyl magnesium iodide and have a sigma value between —.5 and +0.8; and
   (B) at least one bis(dialkylamino)acridine dye of the general structural formula

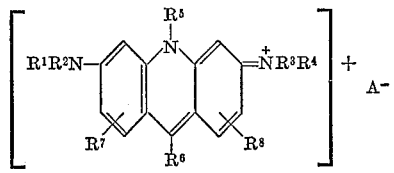

wherein $R^1$ and $R^3$ are each $C_1$–$C_4$ alkyl; $R^2$ and $R^4$ are each hydrogen or $C_1$–$C_4$ alkyl; $R^5$ is hydrogen or $C_1$–$C_4$ alkyl; $R^6$ is hydrogen, $C_1$–$C_4$ alkyl or $C_6$–$C_{10}$ aryl; $R^7$ and $R^8$ are each hydrogen, $C_1$–$C_4$ alkyl, or halogen; and $A^-$ is an inert salt-forming anion; present in an amount sufficient to dissociate the biimidazole to imidazolyl free radicals.

2. The composition of claim 1 which contains additionally
   (C) the leuco form of a dye that is oxidizable to the colored form, and is selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, a leuco indamine, an aminohydrocinnamic acid, a hydrazine, a leuco indigoid dye, an amino-2,3-dihydroanthraquinone, tetrahalo-p,p′-biphenol, a 2(p-hydroxyphenyl) - 4,5 - diphenylimidazole, and a phenethylaniline.

3. The composition of claim 1 wherein in component (A) each aryl group is phenyl and the substituents thereon are lower alkyl, lower alkoxy, chlorine, fluorine or bromine; and wherein in component (B) $R^1$ through $R^4$ are each $C_1$–$C_4$ alkyl; and $R^5$ through $R^8$ are each hydrogen.

4. The composition of claim 3 wherein component (A) is 2,2′-bis(o-chlorophenyl) - 4,4′,5,5′ - tetraphenyl-biimidazole and component (B) is 3,6-bis(diethylamino) acridine hydrochloride.

5. The composition of claim 3 wherein component (A) is 2,2′-bis(o-chlorophenyl) - 4,4′,5,5′ - tetrakis(m-methoxyphenyl)biimidazole and component (B) is 3,6-bis(diethylamino)acridine hydrochloride.

6. The composition of claim 3 which contains additionally
   (C) the leuco form of the acid salt of an aminotriarylmethane dye.

7. The composition of claim 6 wherein in component (A) the 2 and 2′ phenyl groups are each substituted with a chlorine in the ortho position.

8. The composition of claim 7 wherein component (C) is the acid salt of an aminodiphenylarylmethane dye in which the two phenyl groups have (1) an $R^1R^2N$ group in the para position wherein $R^1$ and $R^2$ are each $C_1$–$C_{10}$ alkyl, 2-hydroxyethyl, 2-cyanoethyl, benzyl or phenyl, and have (2) a substituent ortho to the carbon attached to the methane carbon, selected from lower alkyl, lower alkoxy, fluoro, chloro or bromo; and the third aryl is thienyl, furyl, phenyl or phenyl substituted with lower alkyl, lower alkoxy, methylenedioxy, fluoro, chloro, bromo, diethylamino, lower alkylthio or benzylthio.

9. The composition of claim 8 wherein in the aminotriarylmethane, the two phenyl groups substituted with $R^1R^2N$ are each p-diloweralkylamino-o-tolyl.

10. The composition of claim 4 which contains, additionally,
    (C) tris(N,N-diethylamino-o-tolyl)methane.

11. The composition of claim 5 which contains, additionally,
    (C) tris(N,N-diethylamino-o-tolyl)methane.

12. A coating composition comprising a composition of claim 6 in an inert solvent.

13. A coated composition comprising an inert substrate coated with a composition of claim 6.

14. The coated composition of claim 13 wherein the substrate is paper.

15. The coated composition of claim 13 wherein the substrate is a film.

16. A process which comprises irradiating a composition of claim 1 with visible light in a color-forming dosage.

17. A process which comprises irradiating a composition of claim 2 with visible light in a color-forming dosage.

18. A process which comprises irradiating a composition of claim 13 with visible light in a color-forming dosage.

References Cited
UNITED STATES PATENTS

| | | | |
|---|---|---|---|
| 3,099,558 | 7/1963 | Levenis | 96—36.3X |
| 3,390,996 | 7/1968 | MacLachlan | 96—90 |

OTHER REFERENCES

Mees, The Theory of the Photographic Process, The Macmillan Co., 1952, pp. 971 and 991.

NORMAN G. TORCHIN, Primary Examiner

R. E. FICHTER, Assistant Examiner

U.S. Cl. X.R.

96—88